United States Patent
McCahill

(10) Patent No.: US 8,286,438 B2
(45) Date of Patent: Oct. 16, 2012

(54) SYSTEM AND METHOD FOR CONTROLLING A REFRIGERATION DESUPERHEATER

(75) Inventor: David I. McCahill, Champion, PA (US)

(73) Assignee: GeoSystems, LLC, Elk River, MN (US)

( * ) Notice: Subject to any disclaimer, the term of this patent is extended or adjusted under 35 U.S.C. 154(b) by 535 days.

(21) Appl. No.: 12/497,304

(22) Filed: Jul. 2, 2009

(65) Prior Publication Data

US 2010/0005821 A1 Jan. 14, 2010

Related U.S. Application Data

(60) Provisional application No. 61/078,045, filed on Jul. 3, 2008.

(51) Int. Cl.
*F25D 17/02* (2006.01)

(52) U.S. Cl. .......................................................... 62/98

(58) Field of Classification Search ................. 62/238.6, 62/238.7, 228.3, 203, 129, 231, 324.6, 513, 62/98; 165/58, 101; 700/299, 300
See application file for complete search history.

(56) References Cited

U.S. PATENT DOCUMENTS

| | | | | |
|---|---|---|---|---|
| 4,399,664 A * | 8/1983 | Derosier | ...................... | 62/238.7 |
| 4,538,418 A * | 9/1985 | Lawrence et al. | ................. | 62/79 |
| 4,727,727 A * | 3/1988 | Reedy | ........................... | 62/238.6 |
| 4,747,273 A * | 5/1988 | Cook et al. | .................... | 62/238.6 |
| 4,856,578 A * | 8/1989 | McCahill | ...................... | 165/241 |
| 4,887,438 A * | 12/1989 | Meckler | .......................... | 62/271 |
| 5,465,588 A * | 11/1995 | McCahill et al. | .............. | 62/127 |
| 5,613,372 A * | 3/1997 | Beal et al. | ...................... | 62/434 |
| 5,692,387 A * | 12/1997 | Alsenz et al. | .................... | 62/184 |
| 5,758,514 A * | 6/1998 | Genung et al. | ................... | 62/471 |
| 6,253,564 B1 * | 7/2001 | Yarbrough et al. | ........... | 62/238.7 |
| 6,467,303 B2 | 10/2002 | Ross | | |
| 6,729,151 B1 | 5/2004 | Thompson | | |
| 2002/0017107 A1 * | 2/2002 | Bailey et al. | ................. | 62/238.7 |
| 2006/0230770 A1 * | 10/2006 | Kitsch | ............................. | 62/151 |

* cited by examiner

*Primary Examiner* — Mohammad Ali
(74) *Attorney, Agent, or Firm* — Boardman & Clark LLP

(57) ABSTRACT

A system for controlling a desuperheater includes a first temperature sensor coupled to a refrigerant discharge gas line of a compressor; and a controller operatively coupled to at least the first temperature sensor, the compressor, and the desuperheater. The controller controls the desuperheater based at least in part on temperature data received from the first temperature sensor.

11 Claims, 6 Drawing Sheets

SYSTEM AND METHOD FOR CONTROLLING A REFRIGERATION DESUPERHEATER

CROSS REFERENCE TO RELATED APPLICATIONS

This application is based on U.S. Provisional Patent Application No. 61/078,045, entitled "Refrigeration Desuperheater Control", filed Jul. 3, 2008, on which priority of this patent application is based and which is hereby incorporated by reference in its entirety.

BACKGROUND OF THE INVENTION

1. Field of the Invention

The present invention is generally related to heat pumps and, more specifically, to a system and method for controlling the desuperheater function of a heat pump.

2. Description of Related Art

The origin of heat pumps in the United States can be traced back to as early as 1947. However, the commercialization of heat pumps did not gain any market penetration until the mid-1970's. Since that time they have continued to gain market share in the overall residential and commercial application for the primary source of heating and cooling for buildings.

The HVAC (heating, ventilating, air conditioning) industry has accepted the term "heat pump" to mean an appliance used in residential and commercial buildings for space heating and cooling. With reference to FIG. 1, a conventional heat pump 1 includes an evaporator 3 and a condenser 5, whereby heat is absorbed in evaporator 3 (heat exchanger) and released through condenser 5 (heat exchanger). Heat pump 1 can be changed using a reversing valve 7 so that evaporator 3 becomes a condenser and the condenser 5 becomes an evaporator (heat flow is reversed). This heating and cooling process is accomplished by using a vapor compression system utilizing various types of synthetic chemicals called refrigerants (i.e., fluids that can be changed easily from a liquid to a vapor, and from a vapor to a liquid, and are used as a heat transfer medium). Accordingly, heat pump 1 includes five major components: a compressor 9, refrigerant control device (not shown), reversing valve 7, condenser 5, and evaporator 3.

Heat pump 1 is charged with refrigerant in a closed refrigerant circuit, whereby, when compressor 9 (pump) is turned on, it draws (suction) refrigerant gas into a suction port 11 of compressor 9 where it is compressed and pumped out of a discharge port 13 of compressor 9 as a superheated gas at high pressure. This high pressure superheated gas travels to condenser 5 where it is cooled (i.e., gives up its heat) and, as a result, condenses into a liquid refrigerant. The liquid refrigerant is then forced by the pumping action of the compressor 9 to flow through a refrigerant control (i.e., a metering device) into the evaporator 3. The liquid refrigerant, having traveled through the metering device, is now subject to the suction (vacuum side) of compressor 9. As the liquid refrigerant enters the evaporator 3, the low pressure (i.e., suction of the compressor) causes it to evaporate into a cold vapor because such a change is accomplished by a change in heat content, absorbing any heat that is present in evaporator 3. This refrigerant gas, having absorbed heat from evaporator 3, enters suction port 11 of the compressor where the cycle is repeated.

Refrigerant vapor compression systems and specialty heat pumps have the ability to raise the refrigerant discharge gas temperature above 180° F. This superheated refrigerant gas can be used to transfer some of its heat content to water for use in domestic water heating. This can be accomplished by installing a heat exchanger designed for interchange of heat between superheated refrigerant gas and the water. This heat exchanger is commonly referred to as a desuperheater 15. By design, desuperheater 15 can capture only a portion of the heat of compression, while at the same time doing its intended refrigeration job. The desuperheater 15 is installed in the refrigerant discharge line between compressor 9 and condenser 5/evaporator 3.

In heat pump 1, about 25% of the work of condenser 5 is in reducing the superheated refrigerant gas temperature to the condensing temperature. The balance of the work of condenser 5 is in condensing the gas to a vapor and then further subcooling it to a liquid. By design, desuperheater 15 must be sized so that it will only remove some of the superheat (e.g., no more than 25% of the total load on condenser 5). Sizing of desuperheater 15 is critical with heat pumps, for an oversized desuperheater 15 will condense the superheated gas, robbing capacity from the air side condenser which would lower the heat output capacity and air delivery temperature in the space heating mode. With reference to FIG. 2, when a desuperheater 15 is provided in a heat pump refrigerant circuit, the addition of an insulated hot water storage tank 17 is essential for storing hot water to be used later as needed. In addition to the storage tank, a hot water circulator pump 19 is needed to pump the water from storage tank 17 to desuperheater 15 where it is heated and returned to storage tank 17.

Common industry practice in refrigeration equipment and, more specifically, heat pumps, is to control this desuperheating of hot water by the following control method. An electromechanical strap-on aquastat is provided that senses the water temperature leaving desuperheater 15. The aquastat turns on hot water circulator pump 19 when the water temperature drops to a cut-in temperature (e.g., 95° F.) and turns off hot water circulator pump 19 when the leaving water temperature reaches the cut-out temperature (e.g., 120° F.). Power to circulator pump 19 is supplied by a compressor contactor (relay) as illustrated in the wiring diagram of FIG. 3. Thus, circulator pump 19 could not run unless compressor 9 was energized. This control method works, but can be very inefficient and, in some cases, actually works in reverse of intended energy savings. With heat pumps, and more specifically water source heat pumps, there are times when the heat pump discharge gas temperature can be lower than the desired temperature in hot water storage tank 17. If this condition occurs, heat in storage tank 17 can actually be transferred from storage tank 17 to the discharge gas back into condenser 9 of heat pump 1.

Accordingly, a need exists for a method and system for controlling a desuperheater that overcomes some or all of the drawbacks and deficiencies evident in the prior art and described above.

SUMMARY OF THE INVENTION

Therefore, it is an object of the present invention to provide a method and system for controlling a desuperheater that overcomes some or all of the drawbacks and deficiencies evident in the prior art and described above. It is a further object of the present invention to provide a method and system of controlling the desuperheater of a heat pump and, more specifically, a water source heat pump, while increasing its energy saving features.

Accordingly, provided is a system for controlling a desuperheater. The system includes a first temperature sensor coupled to a refrigerant discharge gas line of a compressor; and a controller operatively coupled to at least the first temperature sensor, the compressor, and the desuperheater. The controller controls the desuperheater based at least in part on temperature data received from the first temperature sensor.

The controller may be configured to turn on a circulation pump of the desuperheater when the first temperature sensor determines that a temperature at the refrigerant discharge gas line of the compressor is above an upper threshold temperature, which would enable a rejection of heat to a heat exchanger of the desuperheater. The upper threshold temperature is a temperature that is high enough to heat water to a maximum set point temperature. The controller may be configured to turn off the circulation pump of the desuperheater when the first temperature sensor determines that a temperature at the refrigerant discharge gas line of the compressor is below a lower threshold temperature, which would not be sufficient to transfer heat to water flowing through the desuperheater heat exchanger. The upper threshold temperature and the lower threshold temperature may be set by a user inputting values to the controller.

The system may also further include a second temperature sensor coupled to a water inlet line of the desuperheater. The controller may be configured to turn off the circulation pump of the desuperheater when the second temperature sensor determines that a temperature of water entering the desuperheater has reached a maximum set point temperature. The first temperature sensor and the second temperature sensor may each be one of a thermistor, an RTC, and a thermocouple. The system may also further include a display for displaying temperatures determined by the first temperature sensor, the second temperature sensor, or any combination thereof.

Further provided is a method for controlling a desuperheater. The method includes the steps of: providing a first temperature sensor coupled to a refrigerant discharge gas line of a compressor; providing a controller operatively coupled to at least the first temperature sensor, the compressor, and the desuperheater; and controlling the desuperheater with the controller based at least in part on temperature data received from the first temperature sensor.

The controller may be configured to turn on a circulation pump of the desuperheater when the first temperature sensor determines that a temperature at the refrigerant discharge gas line of the compressor is above an upper threshold temperature, which would enable a rejection of heat to a heat exchanger of the desuperheater. The upper threshold temperature is a temperature that is high enough to heat water to a maximum set point temperature. The controller may be configured to turn off the circulation pump of the desuperheater when the first temperature sensor determines that a temperature at the refrigerant discharge gas line of the compressor is below a lower threshold temperature, which would not be sufficient to transfer heat to water flowing through the desuperheater heat exchanger. The upper threshold temperature and the lower threshold temperature may be set by a user inputting values to the controller.

The method may further include the step of providing a second temperature sensor coupled to a water inlet line of the desuperheater. The controller may be configured to turn off the circulation pump of the desuperheater when the second temperature sensor determines that a temperature of water entering the desuperheater has reached a maximum set point temperature. The first temperature sensor and the second temperature sensor may each be one of a thermistor, an RTC, and a thermocouple.

Still further provided is a method of controlling a desuperheater comprising the steps of: a) providing a first temperature sensor coupled to a refrigerant discharge gas line of a compressor; b) providing a second temperature sensor coupled to a water inlet line of the desuperheater; c) providing a controller operatively coupled to at least the first temperature sensor, the second temperature sensor, the compressor, and the desuperheater, wherein the controller includes a display and a user interface; d) selecting a mode of operation of the desuperheater using the user interface of the controller; e) turning on a circulation pump for a pre-programmed interval of time in order to sample a water inlet temperature with the second temperature sensor; and f) continuously monitoring a refrigerant discharge gas temperature with the first temperature sensor and starting or stopping a desuperheating function of the desuperheater by: i) turning on, based at least in part on a signal provided by the controller, a circulation pump of the desuperheater when the first temperature sensor determines that a temperature at the discharge gas line of the compressor is above an upper threshold temperature; and ii) turning off, based at least in part on a signal provided by the controller, the circulation pump of the desuperheater when either the first temperature sensor determines that a temperature at the discharge gas line of the compressor is below a lower threshold temperature or the second temperature sensor determines that a temperature of water entering the desuperheater has reached a maximum cut-out temperature.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PRESENT INVENTION

Figure 1:
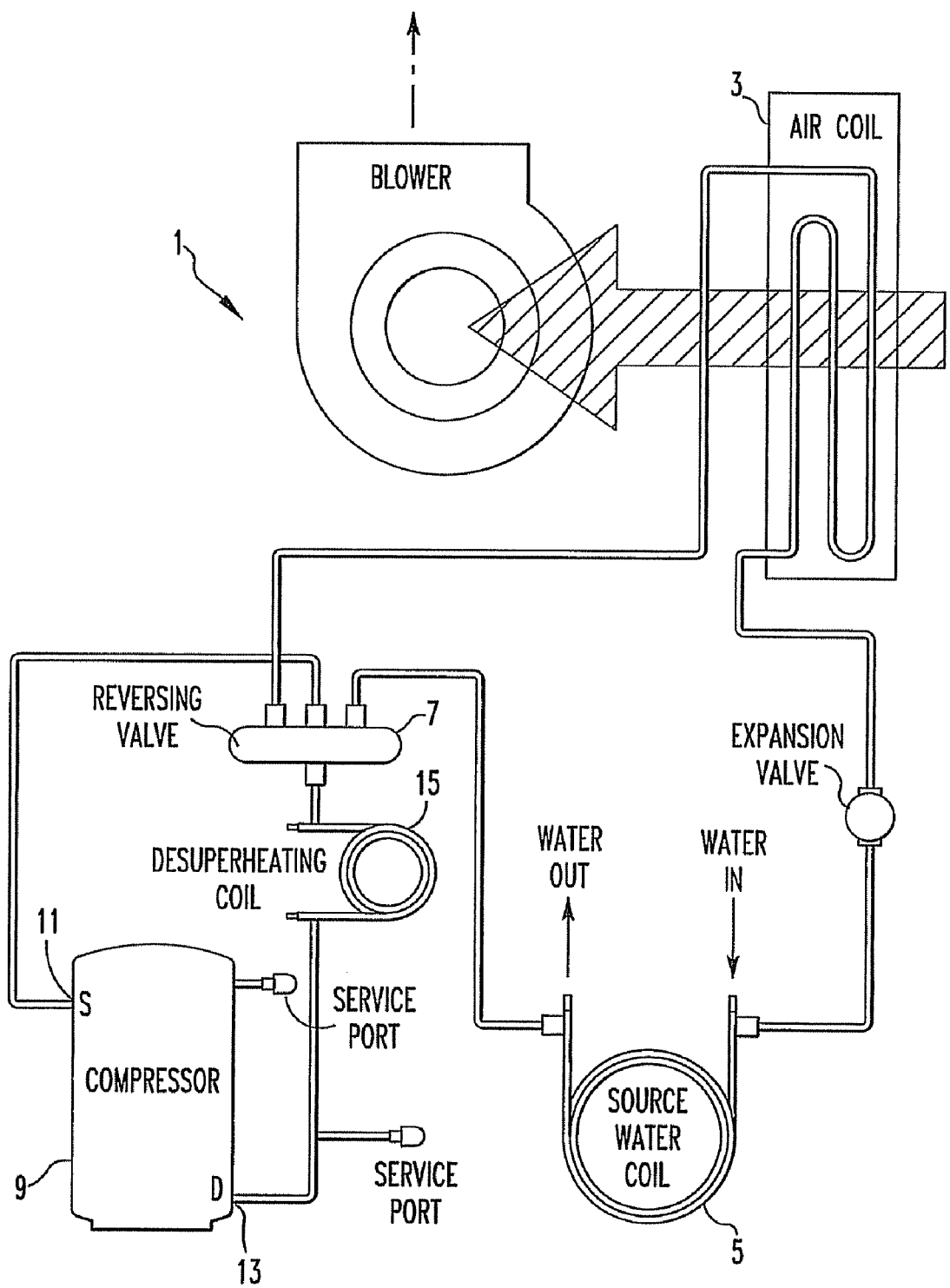
FIG. 1 is a schematic diagram of a conventional heat pump refrigerant circuit.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 4:
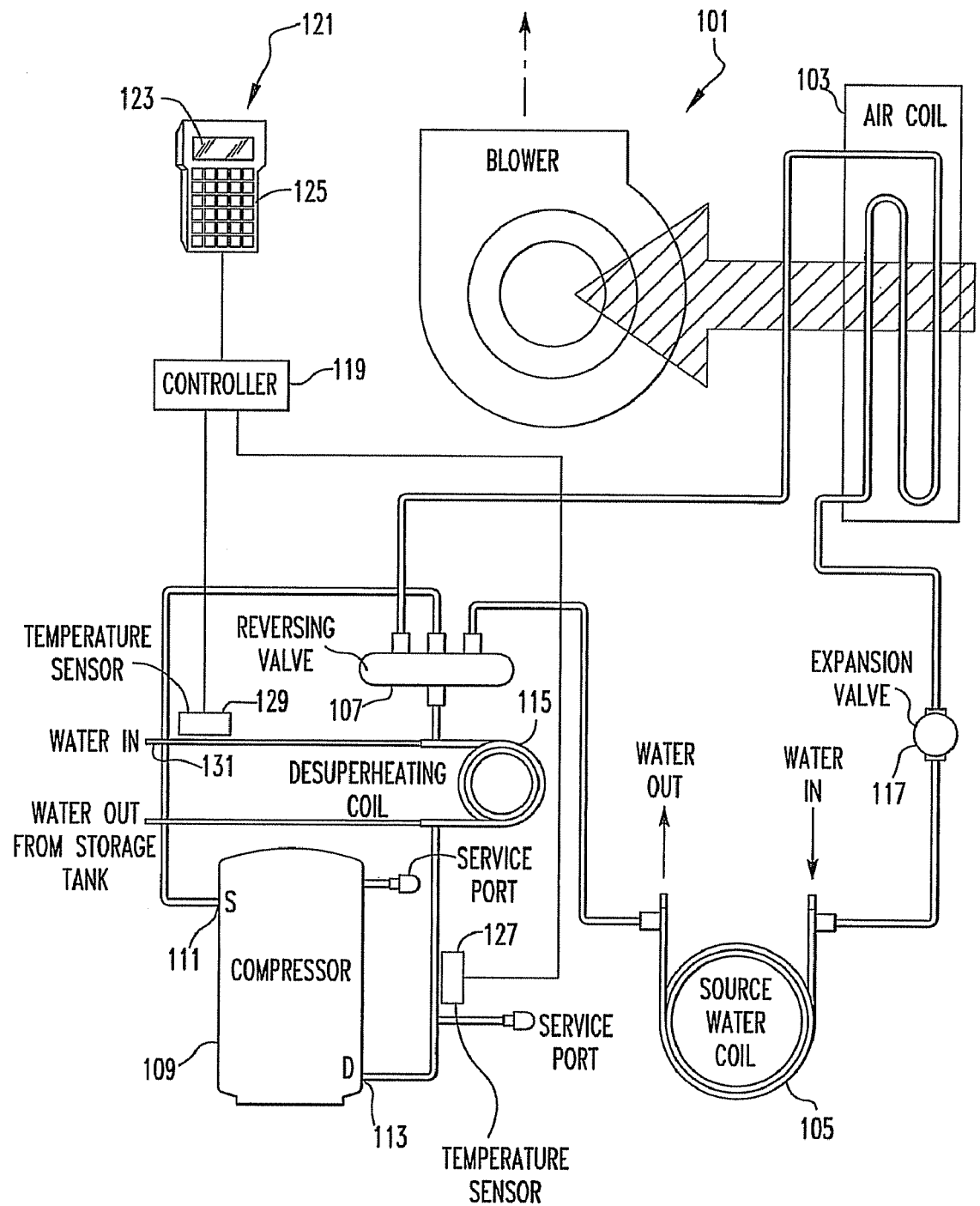
FIG. 4 is a schematic diagram of a heat pump refrigerant circuit including the desuperheater control system in accordance with the present invention.

With reference to FIG. 4, a heat pump 101 includes five major components: an evaporator 103, a condenser 105, a reversing valve 107, a compressor 109, and a desuperheater 115. Heat is absorbed in evaporator 103 (heat exchanger) and released through condenser 105 (heat exchanger). Heat pump 101 can be changed using a reversing valve 107 so that evaporator 103 becomes a condenser and the condenser 105 becomes an evaporator (heat flow is reversed).

Evaporator 103 is a refrigeration mechanism that is used to absorb heat. In evaporator 103, liquid refrigerant boils or evaporates and cooling takes place. The two basic types of evaporators used in heat pumps are: fin-tube with forced air circulation and water-to-refrigerant comprising two tubes, one within the other. However, this is not to be construed as limiting the present invention as any suitable evaporator may be used.

Condenser 105 is a refrigeration mechanism that removes the condensation heat from the hot refrigerant vapor. The two basic types of condensers used in heat pumps are: fin-tube with forced air circulation and water-to-refrigerant comprising two tubes, one within the other. However, this is also not to be construed as limiting the present invention as any suitable condenser may be used.

Reversing valve 107 is a four-way reversing valve that is controlled electronically and allows for the reversal of the refrigerant flow from condenser 105 (i.e., a refrigerant-to-water heat exchanger) and evaporator 103 (i.e., refrigerant-to-air heat exchanger). When heat pump 101 is used for space heating, evaporator 103, embodied as a finned tube heat exchanger, for instance, acts as a condenser and reversing valve 107 directs the hot refrigerant gas to the finned tube heat exchanger. Alternatively, when heat pump 101 is in the space cooling mode, reversing valve 107 directs the hot refrigerant gas to condenser 105, which is embodied as a refrigerant-to-water coaxial heat exchanger, for instance.

Compressor 109 may be one of the five basic types of compressors used in the HVAC industry. These five types of compressors are reciprocating (piston-cylinder), rotary, scroll, screw, and centrifugal. The original energy source for most compressors is an electric motor sealed inside a dome or housing of the compressor. Compressor 109 is configured to pump or move refrigerant vapor from a refrigerant suction line 111 through an intake port (not shown). From there, the refrigerant is compressed into a smaller space. The compressed refrigerant is then pushed out of compressor 109 via a hot refrigerant gas discharge line 113.

Desuperheater 115 is embodied as a heat exchanger designed for interchange of heat between super-heated refrigerant gas and water. The heat exchanger is installed in hot refrigerant gas discharge line 113 between compressor 109 and evaporator 103, acting as a condenser, and/or condenser 105. The heat exchanger of desuperheater 115 is designed to pick up no more than 20% of the total rated load of evaporator 103, acting as a condenser, or condenser 105. Desuperheater 115 is shown in FIG. 4 as a tube-in-tube coiled heat exchanger; however, this is not to be construed as limiting the present invention as any suitable heat exchanger may be utilized.

Heat pump 101 may further include an expansion valve 117. Expansion valve 117 is provided to regulate the rate of refrigerant liquid flow into evaporator 103 in the exact proportion to the rate of evaporation of the refrigerant liquid in evaporator 103.

Heat pump 101 is also provided with a control system for controlling the functionality of desuperheater 115. The control system of the present invention allows for monitoring the discharge gas temperature, turning on and off a desuperheater hot water circulator pump, and display and adjustment of the water temperature in hot water storage tank 17 as will be discussed in greater detail hereinafter. The control system includes a controller 119, a display terminal 121 having a display 123 and a user interface 125, a first temperature sensor 127, and a second temperature sensor 129. First temperature sensor 127 is affixed to compressor gas discharge line 113. Second temperature sensor 129 is affixed to an entering water line 131 to desuperheater 115. Sensor 127 and sensor 129 may be a thermistor, an RTC, or a thermocouple. However, this is not to be construed as limiting the present invention as any suitable temperature sensing mechanism may be utilized.

Figure 2:
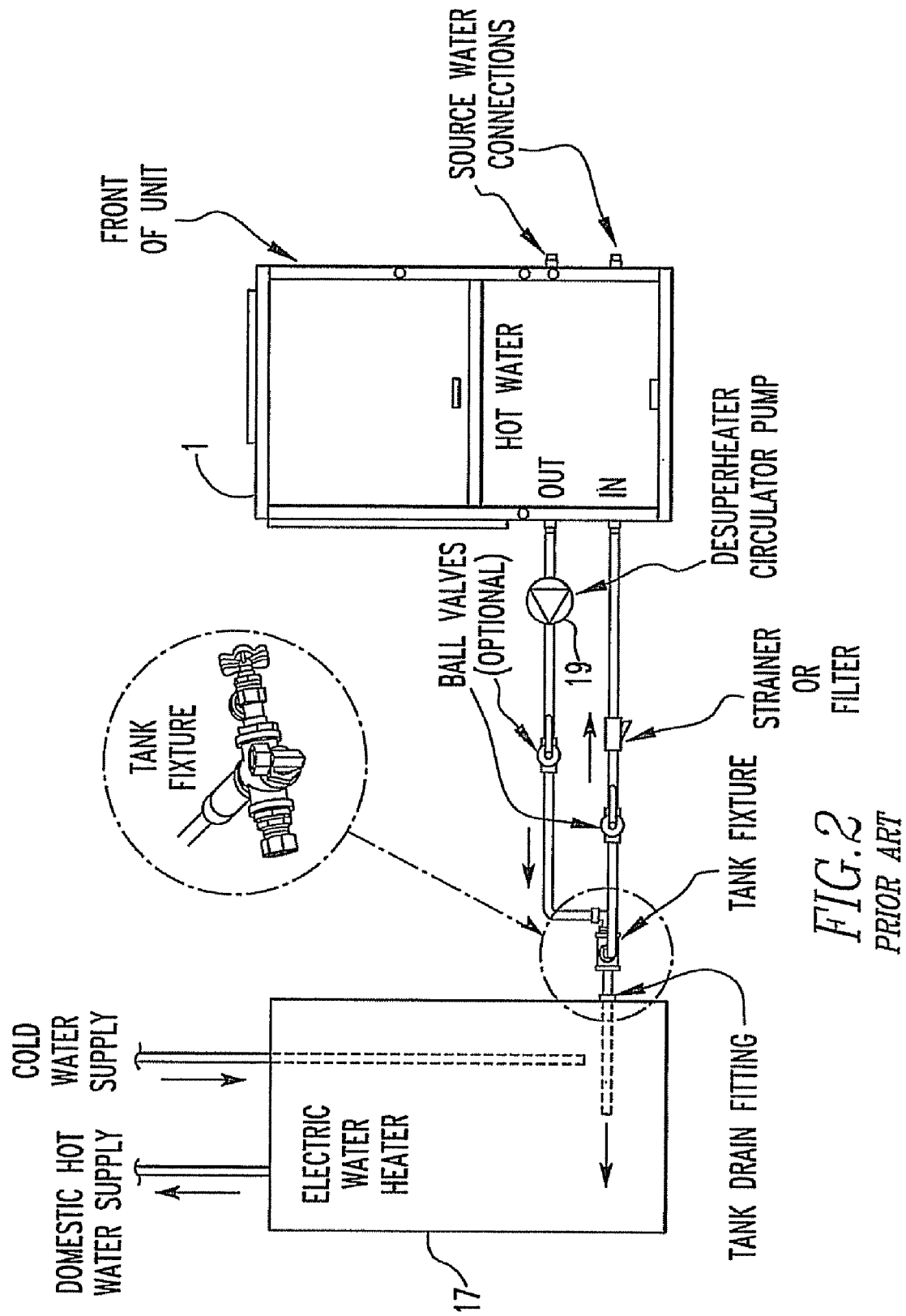
FIG. 2 is a schematic diagram of a conventional piping arrangement for a desuperheater.
Figure 3:
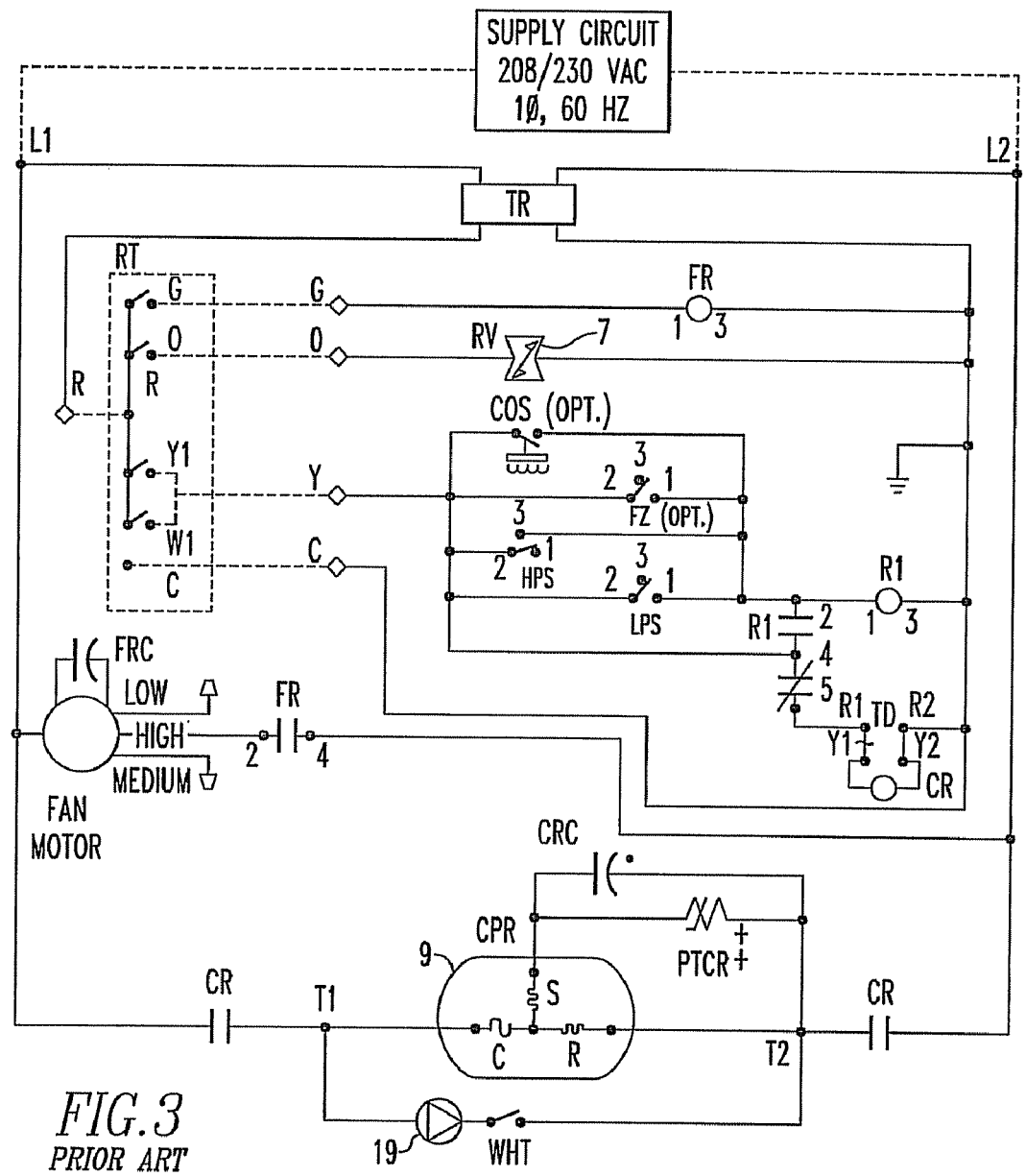
FIG. 3 is a schematic wiring diagram illustrating a conventional control system for a desuperheater.
Figure 5:
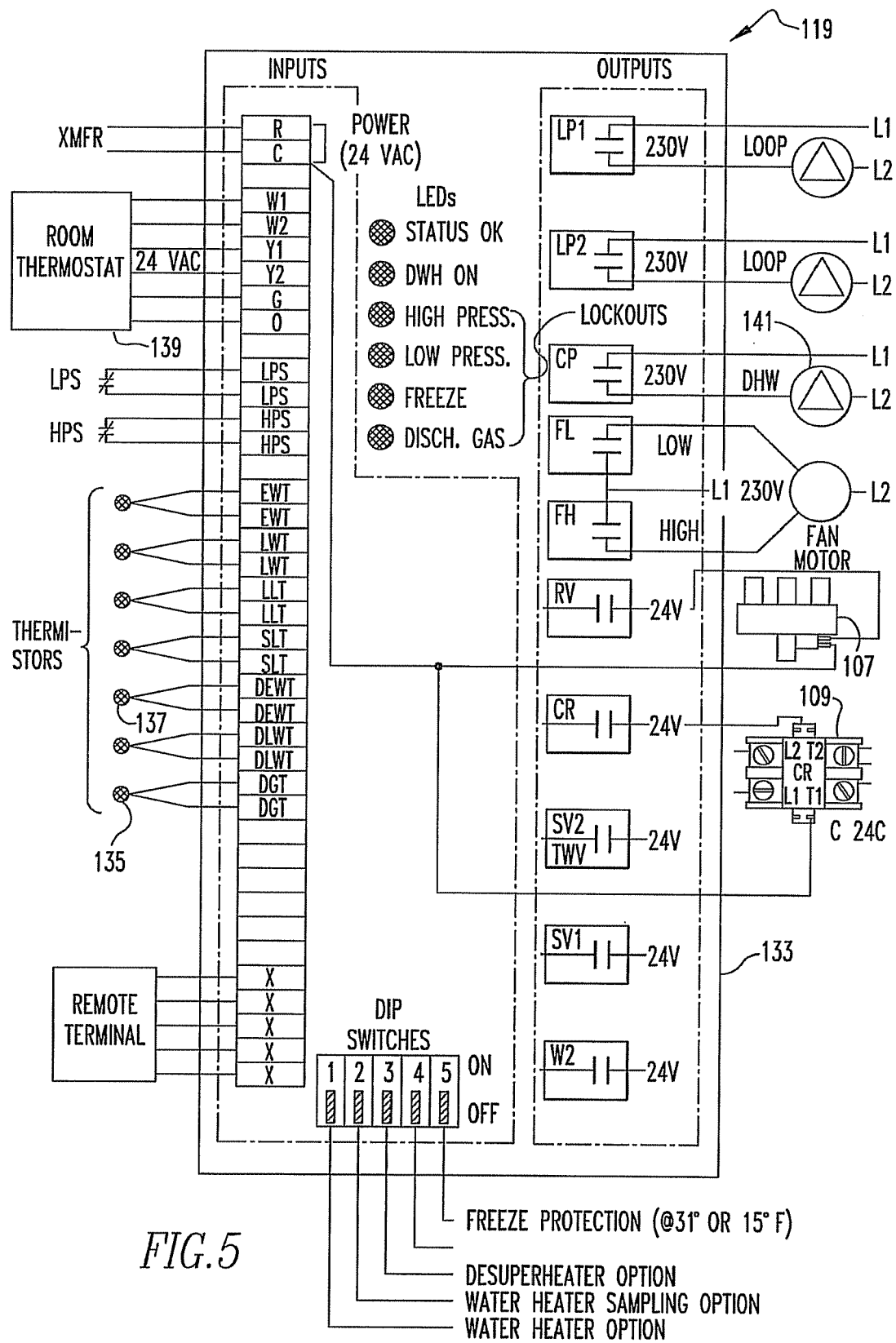
FIG. 5 is a schematic diagram of a controller of a desuperheater control system in accordance with the present invention.

With reference to FIG. 5, and with continuing reference to FIG. 4, controller 119 is embodied as a solid state printed circuit board 133 with a programmable microprocessor or flash memory chip capable of interpreting all analog or digital inputs 135, 137 from temperature sensors 127, 129, respectively, and from room thermostat 139 on a call for heating or cooling, and is capable of outputting analog or digital signals to turn on or off compressor 109, desuperheater circulator pump relay 141 (see FIG. 2), reversing valve 107, and fan motor 143.

Figure 6:
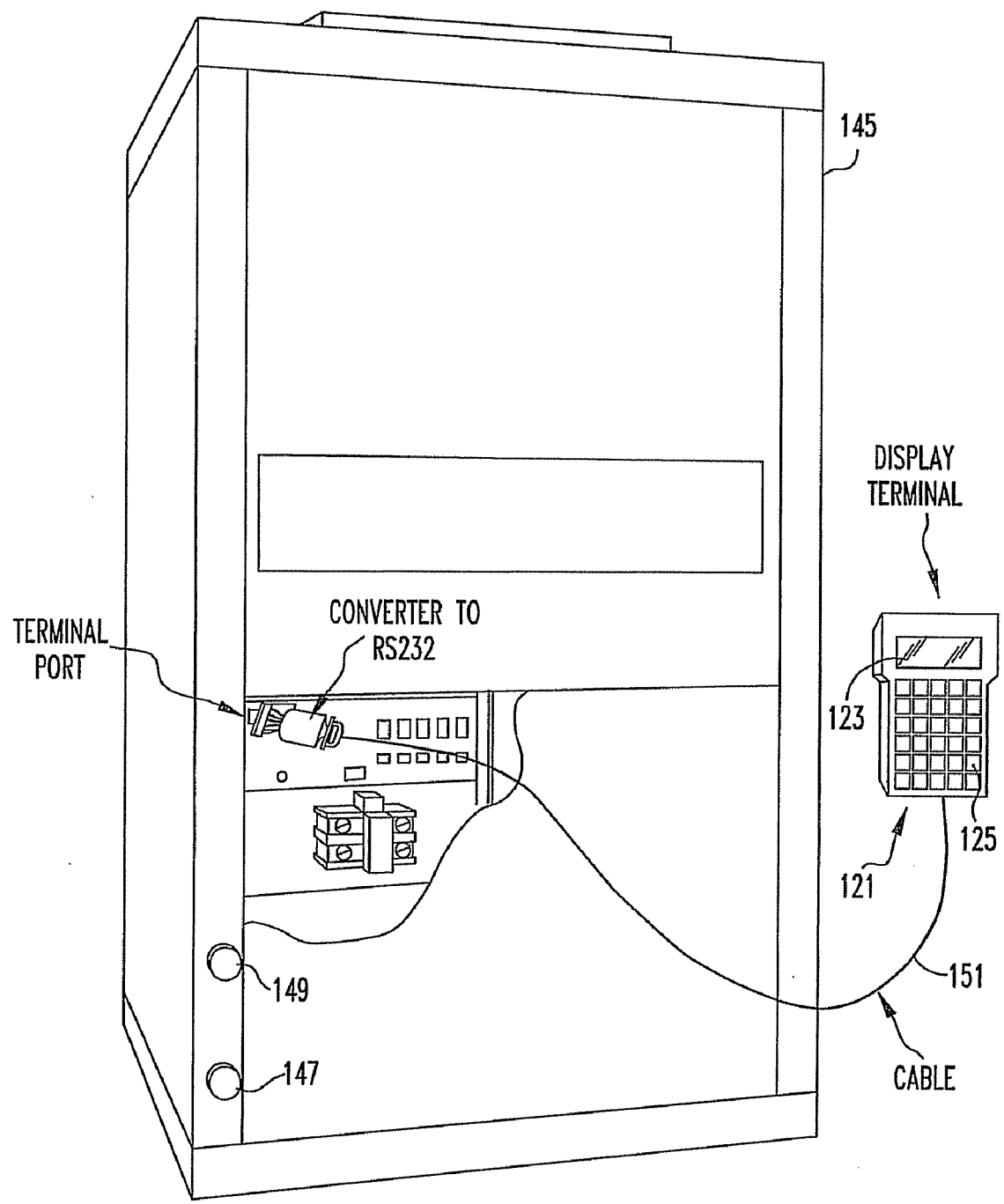
FIG. 6 is a perspective view of a heat pump utilizing the desuperheater control system in accordance with the present invention.

With reference to FIG. 6, and with continuing reference to FIGS. 4 and 5, the components of heat pump 101 may be enclosed within a housing 145. Housing 145 includes a hot water inlet 147 and a hot water outlet 149. Display terminal 121 is configured to be coupled to controller 119 by a cable 151 or any other suitable communication technique, such as a wireless configuration. Controller 119 is mounted within housing 145.

In operation, controller 119 controls desuperheater 115 as follows. Each time there is an input to controller 119 to turn on compressor 109, controller 119 samples first temperature sensor 127 to determine the temperature at hot refrigerant gas discharge line 113 of compressor 109. This temperature is then compared to an upper threshold temperature by controller 119. The upper threshold temperature is a temperature that is high enough to heat water to a maximum set point temperature (for example, about 130° F.). If the measured temperature exceeds the upper threshold temperature, controller 119 turns on hot water circulator pump 141 of desuperheater 115. Circulator pump 141 continues to run until compressor 109 is turned off or the water temperature has reached its maximum set point temperature as determined by second temperature sensor 129 positioned at water inlet line 131.

In addition, if at any time during a heating or cooling cycle, first temperature sensor 127 determines that a temperature at discharge gas line 113 of compressor 109 is below a lower threshold temperature, controller 119 turns off hot water circulator pump 141 of desuperheater 115. The lower threshold temperature is a temperature (i.e., a minimum set point temperature) that would not be sufficient to transfer heat to water flowing through the heat exchanger of desuperheater 115 (for example, about 100° F.). After a brief timeout, controller 119 samples first temperature sensor 127 for the purpose of reactivating desuperheater 115.

The upper threshold temperature, lower threshold temperature, maximum set point temperature, and minimum set point temperature are all user-programmable using user interface 125 of display terminal 121. The current temperatures as measured by first temperature sensor 127 and second temperature sensor 129, as well as the upper threshold temperature, lower threshold temperature, maximum set point temperature, and minimum set point temperature, are each displayed on display 123 of display terminal 121. Desirably, display terminal 121 is a hand-held terminal and display 123 is a liquid crystal display. However, this is not to be construed as limiting the present invention as any suitable display terminal and display may be utilized.

In addition, at any time during the above-described process, the user can select, using user interface 125 of display terminal 121, which mode of operation the desuperheater function should be used. The possible combinations of the function of desuperheater 115 are as follows: space heating or space cooling, both space heating and space cooling, or none at all.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A system for controlling a desuperheater comprising:
   a first temperature sensor coupled to a refrigerant discharge gas line of a compressor;
   a second temperature sensor coupled to a water inlet line of the desuperheater; and
   a controller operatively coupled to at least the first temperature sensor, the second temperature sensor, the compressor, and the desuperheater,
   wherein the controller starts or stops a desuperheating function of the desuperheater by;
      i) turning on a circulation pump of the desuperheater when the first temperature sensor determines that a temperature at the discharge gas line of the compressor is above an upper threshold temperature; and
      ii) turning off the circulation pump of the desuperheater when either the first temperature sensor determines that a temperature at the discharge gas line of the compressor is below a lower threshold temperature or the second temperature sensor determines that a temperature of water entering the desuperheater has reached a maximum set point temperature.

2. The system as defined claim 1, wherein the upper threshold temperature is a temperature that is high enough to heat water to a maximum set point temperature.

3. The system as defined in claim 1, wherein the upper threshold temperature and the lower threshold temperature are set by a user inputting values to the controller.

4. The system as defined in claim 1, wherein the first temperature sensor is one of a thermistor, an RTC, and a thermocouple.

5. The system as defined in claim 1, wherein the second temperature sensor is one of a thermistor, an RTC, and a thermocouple.

6. The system as defined in claim 1, further comprising a display for displaying temperatures determined by the first temperature sensor, the second temperature sensor, or any combination thereof.

7. A method of controlling a desuperheater comprising the steps of:
   a) providing a first temperature sensor coupled to a refrigerant discharge gas line of a compressor;
   b) providing a second temperature sensor coupled to a water inlet line of the desuperheater;
   c) providing a controller operatively coupled to at least the first temperature sensor, the second temperature sensor, the compressor, and the desuperheater, wherein the controller includes a display and a user interface;
   d) selecting a mode of operation of the desuperheater using the user interface of the controller;
   e) turning on a circulation pump for a pre-programmed interval of time in order to sample a water inlet temperature with the second temperature sensor; and
   f) continuously monitoring a refrigerant discharge gas temperature with the first temperature sensor and starting or stopping a desuperheating function of the desuperheater by:
      i) turning on, based at least in part on a signal provided by the controller, a circulation pump of the desuperheater when the first temperature sensor determines that a temperature at the discharge gas line of the compressor is above an upper threshold temperature; and
      ii) turning off, based at least in part on a signal provided by the controller, the circulation pump of the desuperheater when either the first temperature sensor determines that a temperature at the discharge gas line of the compressor is below a lower threshold temperature or the second temperature sensor determines that a temperature of water entering the desuperheater has reached a maximum set point temperature.

8. The method as defined in claim 7, wherein the upper threshold temperature is a temperature that is high enough to heat water to a maximum set point temperature.

9. The method as defined in claim 7, wherein the upper threshold temperature and the lower threshold temperature are set by a user inputting values to the controller.

10. The method as defined in claim 7, wherein the first temperature sensor is one of a thermistor, an RTC, and a thermocouple.

11. The method as defined in claim 7, wherein the second temperature sensor is one of a thermistor, an RTC, and a thermocouple.

* * * * *